: US 7,809,974 B2

(12) United States Patent
Boerstler et al.

(10) Patent No.: US 7,809,974 B2
(45) Date of Patent: *Oct. 5, 2010

(54) CIRCUIT TO REDUCE POWER SUPPLY FLUCTUATIONS IN HIGH FREQUENCY/HIGH POWER CIRCUITS

(75) Inventors: David William Boerstler, Round Rock, TX (US); Eskinder Hailu, Austin, TX (US); Mack Wayne Riley, Austin, TX (US); Michael Fan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/014,830

(22) Filed: Jan. 16, 2008

(65) Prior Publication Data
US 2008/0133957 A1    Jun. 5, 2008

Related U.S. Application Data

(63) Continuation of application No. 10/955,121, filed on Sep. 30, 2004, now Pat. No. 7,350,096.

(51) Int. Cl.
*H04L 25/00* (2006.01)
(52) U.S. Cl. ............ 713/501; 713/400; 713/401; 713/500; 713/502; 713/503; 713/504; 713/600; 713/601
(58) Field of Classification Search ......... 713/400–401, 713/500–503, 600–601
See application file for complete search history.

(56) References Cited

U.S. PATENT DOCUMENTS

| | | | |
|---|---|---|---|
| 4,654,851 A | 3/1987 | Busby | |
| 4,733,197 A * | 3/1988 | Chow | 331/1 A |
| 5,964,881 A | 10/1999 | Thor | |
| 6,700,421 B1 | 3/2004 | Mirov et al. | |
| 6,750,693 B1 | 6/2004 | Duewer | |
| 7,000,130 B2 | 2/2006 | Adachi | |
| 7,350,096 B2 * | 3/2008 | Boerstler et al. | 713/501 |
| 7,430,264 B2 | 9/2008 | Boerstler et al. | |
| 2004/0223575 A1 | 11/2004 | Meltzer et al. | |
| 2005/0198550 A1 | 9/2005 | Ramsden | |
| 2006/0069929 A1 | 3/2006 | Boerstler et al. | |
| 2006/0093047 A1 | 5/2006 | Boerstler et al. | |
| 2008/0272820 A1 | 11/2008 | Boerstler et al. | |

OTHER PUBLICATIONS

U.S. Appl. No. 10/955,121, Image File Wrapper printed May 11, 2010, 2 pages.
U.S. Appl. No. 10/981,154, Image File Wrapper printed May 11, 2010, 2 pages.
U.S. Appl. No. 12/132,871, Image File Wrapper printed May 11, 2010, 2 pages.

* cited by examiner

*Primary Examiner*—Abdelmoniem Elamin
(74) *Attorney, Agent, or Firm*—Stephen J. Walder, Jr.; Matthew B. Talpis

(57) ABSTRACT

A circuit for transitioning clocking speeds, or frequencies, is provided. With this circuit, a clocking circuit providing a first clock signal at a first clock frequency is coupled to a counter. A comparator and a first divider are coupled to an output of the counter. The first divider outputs a second clock signal at a second clock frequency. A second divider is interposed between the clocking circuit and the counter. A processor is coupled to an output of the first divider.

13 Claims, 3 Drawing Sheets

CIRCUIT TO REDUCE POWER SUPPLY FLUCTUATIONS IN HIGH FREQUENCY/HIGH POWER CIRCUITS

This application is a continuation of application Ser. No. 10/955,121, filed Sep. 30, 2004, now U.S. Pat. 7,350,096.

TECHNICAL FIELD

The present invention relates generally to reducing transient power fluctuations and, more particularly, to reducing power fluctuations in high power circuits.

BACKGROUND

As the operating frequency of micro-processors has increased, the resulting power dissipation has become a major bottle-neck in implementing large high performance systems. As a result, the package and cooling cost necessary to deal with the large power dissipation is accounting for a larger portion of total chip cost. For low-power mobile systems, the battery life-time is directly related to the power dissipation of the chip. Therefore, it is sought to increase the shelf-life of batteries. One way this is achieved is by clock gating, wherein the clock input to non-active circuit blocks is reduced in frequency or disabled completely.

However, the process of scaling down the clock frequency introduces additional challenges. FIG. 1 displays a simplified diagram of an electronic system having a power supply source, a printed circuit board (PCB), package, and chip. Power supply is delivered at the PCB end. The chip would like to interact with a stable power supply that is not affected by transient current consumption. A stable power supply becomes critical as the operating power supply is reduced, since any transient supply voltage fluctuations at the chip can account for a large portion of the desired power supply. To reduce transient current induced power supply functions, one generally minimizes the series inductance and resistance, while adding a large decoupling capacitance between VDD and GND. Where dI/dt is very large, the transient supply voltage swing caused by the series inductance can become very large. Hence, it is essential to reduce dI/dt when the chip is switched between various modes of operation.

Therefore, there is a need to reduce transient current in a manner that addresses at least some of the limitations of conventional power distribution networks.

SUMMARY OF THE INVENTION

A circuit for transitioning clocking speeds, or frequencies, is provided. With this circuit, a clocking circuit providing a first clock signal at a first clock frequency is coupled to a counter. A comparator and a first divider are coupled to an output of the counter. The first divider outputs a second clock signal at a second clock frequency. A second divider is interposed between the clocking circuit and the counter. A processor is coupled to an output of the first divider.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
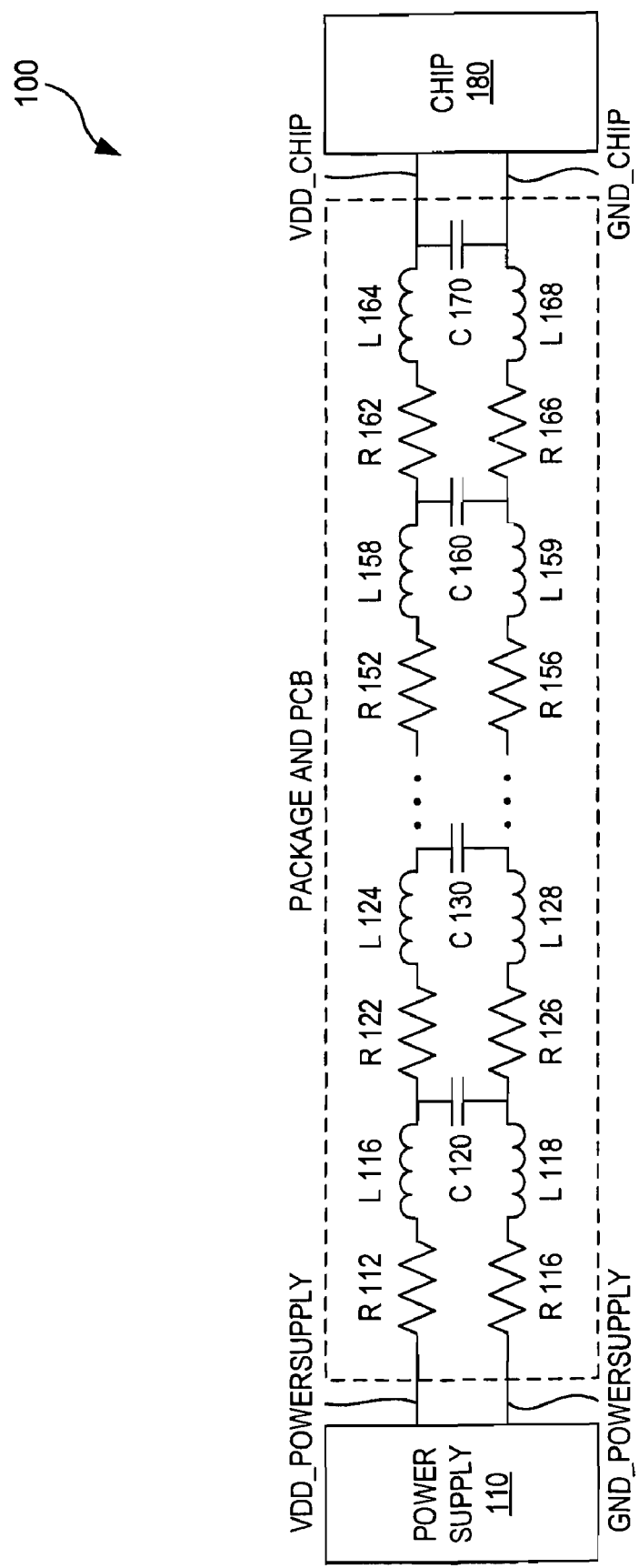
FIG. 1 schematically depicts a power supply source, package, printed circuit board (pcb), and chip in which, in part due to the parasitic series inductance and resistance present in the package and PCB, any transient current arising from the chip can result in transient voltage swing at VDD_CHIP and GND_CHIP.

Turning to FIG. 1, illustrated is a circuit 100 in which significant power surges can occur at the moment when the chip 180 operating frequency is changed. A power supply 110 is coupled to a resistor ("R") 112 and a R 116. The R 112 is coupled to an inductor ("L") 116, and the R 116 is coupled to an L 118. There is a capacitor ("C") 120 coupled between the L 116 and the L 118. The L 116 is coupled to an R 122, and the L 118 is coupled to an R 126.

The R 122 is coupled to L 124, and the R 126 is coupled to an L 128. There is a C 130 coupled between the L 124 and the L 128. The series of alternating resistors, inductors, and capacitors is repeated across the circuit, and is coupled to an R 152 and an R 156.

The R 152 is coupled to L 158, and the R 156 is coupled to an L 159. There is a C 160 coupled between the L 158 and the L 159. An R 162 is coupled to L 164, and an R 166 is coupled to an L 168. There is a C 170 coupled between the L 164 and the L 168. A chip 180 is coupled to the L 164 and the L 168. In FIG. 1, serious fluctuations can occur in the system 100 when the chip 180 changes from one clocking frequency to a second clocking frequency, thereby creating current surges within the various passive devices of FIG. 1.

Figure 2:
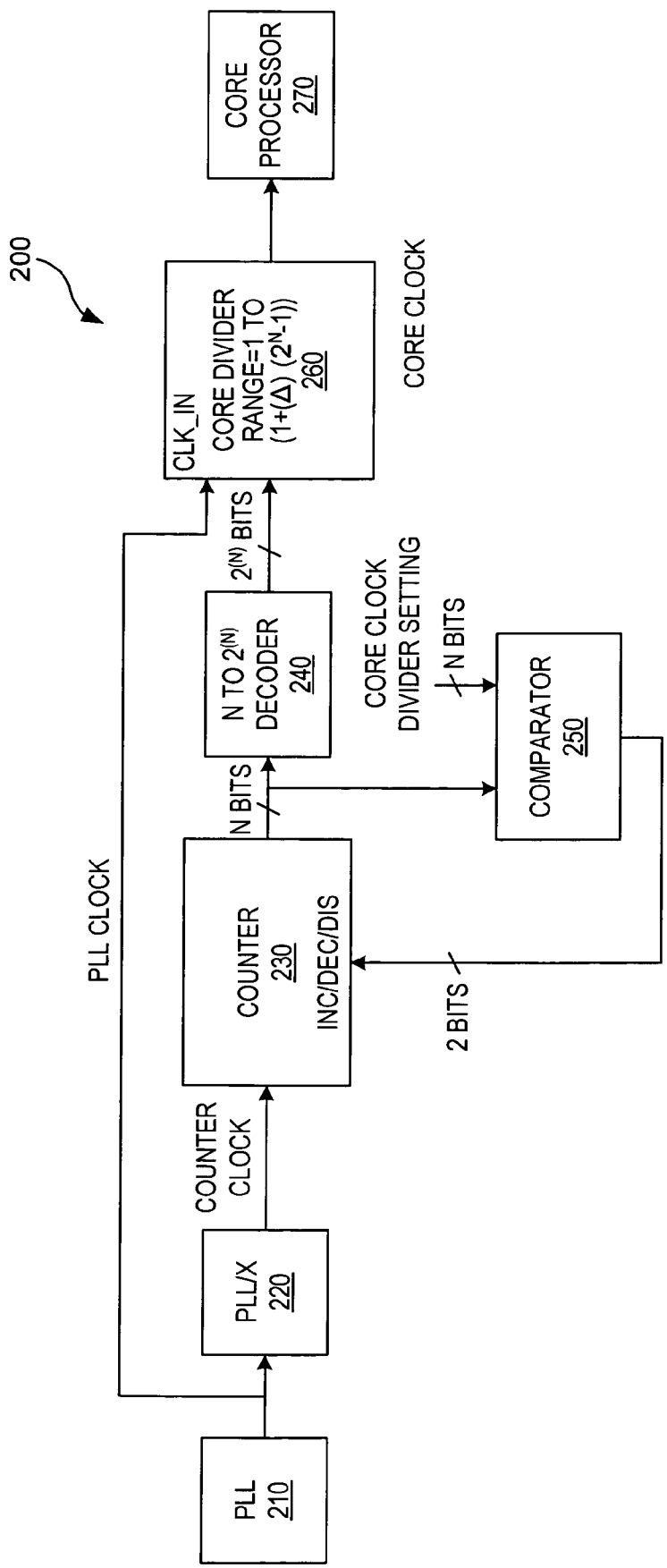
FIG. 2 schematically depicts a circuit for incrementally changing the clock speed of a processor from one clock speed to another clock speed.

Turning now to FIG. 2, illustrated is a circuit 200 for reducing dI/dt transitions in the passive elements of the circuit 100 when switching from one operating frequency to another operating frequency within a core processor 270. The core processor 270 could be similar to the chip 180 used in the circuit 100. A phase locked loop (PLL) 210 is coupled to a PLL divider circuit 220. Generally, the divider circuit 220 outputs a clock pulse to a counter 230 proportionally to the number of PLL pulses received by the PLL divider 220. For instance, if the divide-by value is two, the PLL divider 220 outputs 1 clock pulse for every two received PLL pulses. If the divide-by value of the PLL divider 220 is 20, then the PLL divider 220 outputs one clock pulse for every 20 PLL clock pulses received from the PLL 210, and so on. However, those of skill in the art understand that other clocking circuitry could be used instead of a PLL.

In any event, the PLL divider circuit 220 is coupled to a counter circuit 230. The counter circuit 230 can either increment, decrement, or be disabled as a function of the output of a comparator 250. The counter 230 outputs a signal as "n bits". For instance, for a 3-bit counter, the output value of 0 could be 000, 1 would be 001, 2 would be 010, 3 would be 011, 4 would be 100, and so on.

This value is sent to an N to $2^N$ decoder 240, which decodes the n-bit binary input. This decoded binary number is then input into a core processor speed divider circuit (core divider) 260. The PLL 210 is also coupled to the core divider 260. The core divider 260 outputs a driving clock frequency to the core processor 270 as a function of a combination of the PLL clock frequency and the output of the decoder 240.

Generally, the core divider 260 is employed to apply one of a plurality of speeds as a selected clock speed to the core processor 270. For instance, for a 3-bit counter, if the decoder value is a 1000000, this could mean that the core divider 260 drives the core processor 270 at full PLL speed, perhaps 1 GHz. If the decoder value is a 01000000, this could mean that the core divider 260 drives the core processor 270 at 90 percent PLL clock speed, perhaps 900 MHZ. If the decoder value is 00100000, this could mean that the core divider 260 drives the core processor 270 at 80 percent clock speed, perhaps 800 MHZ, and so on.

Use of the PLL divider 220 in conjunction with the core divider 260 can lead to results in which current spikes in the circuit 100 are lessened. The PLL divider 220 only outputs a clock pulse once every so many predefined number of PLL clock pulses. This means that the counter 230 only increments or decrements its clocking output every "X" number of PLL clock transitions. Therefore, the core divider 260 changes its driving frequency to the core processor 270 every "X" number of PLL cycles.

Therefore, the circuit 200 can reduce current spikes in at least two ways. The first is to change, incrementally, the driving clock frequency of the core processor 270. A further way to reduce current spikes is to change the rate at which the core divider 260 changes the driving clock frequency of the core processor 270. This can be achieved by selecting the magnitude of the division increments that the core divider can introduce. In FIG. 2, this incremental division step is called Δ.

Typically, the counter 230 is edge triggered. A PLL signal from the PLL divider 220 provides the triggering event. The counter 230 also has a two-bit control input labeled 'INC/DEC/DIS'.

These control inputs work as follows. When INC is selected by the comparator 250, then the counter 230 increments its count from its previous value. The increments take place on the edge (rising or falling) of the output of the PLL divider 220. When DEC is selected by the comparator 250, then the counter 230 decrements its count from its previous value. The decrements take place on the edge (rising or falling) of COUNTER CLOCK from the PLL divider 220. When DIS is selected by the comparator 250, then the counter 230 is disabled and it retains its current value regardless of COUNTER CLOCK.

Generally, the comparator 250 essentially compares the current desired CORE CLOCK DIVIDER SETTING and compares it with the output of the counter 230.

The CORE CLOCK DIVIDER SETTING represents the desired core processor 270 clocking speed. If CORE CLOCK DIVIDER SETTING is greater than the present output of the counter 230, then the comparator 250 output selects INC. In this case counter 230 and therefore core divider 260 will increment their values on an edge of COUNTER CLOCK. This process continues until the output of counter 230 equals that of CORE CLOCK DIVIDER SETTING. If the CORE CLOCK DIVIDER SETTING is less than the current output of the counter 230, then the comparator 250 output selects DEC. In this case counter 230 and therefore core divider 260 will decrement their values on an edge of COUNTER CLOCK. This process continues until the output of counter 230 equals that of CORE CLOCK DIVIDER SETTING. If CORE CLOCK DIVIDER SETTING is equal to the current output of the counter 230, then the comparator 250 output selects DIS. In this case, counter 230 and therefore core divider 260 will maintain their current value. For instance, instead of changing from 1 MHz to a 2 MHz processing speed in one PLL clock transition, the processing speed of the core processor 270 could change from 1.000 MHz, 1.001 MHz, 1.002 MHz, and so on, as a function of the core divider 260, between each PLL clock cycle. Furthermore, depending upon the divider ratio of the PLL divider 220, each incremental change of core divider 260 output clock frequencies can occur over a plurality of PLL clock transitions.

For example, let the CORE CLOCK frequency=PLL CLOCK (frequency)/$D_{initial}$, where $D_{initial}$ is the current core divider 260 ratio setting. Next, at some later time, $D_{initial}$ is changed to $D_{final}$.

Let $D_{final}=D_{initial}+\Delta N$ where N is an integer, and Δ is the incremental divider ration introduced by core divider 260.

Therefore, assuming /X=/1, it takes N PLL CLOCK cycles from the PLL divider 220 for the core clock 270 to go from a frequency of PLL 210 (frequency)/$D_{initial}$ to PLL 210 (frequency)/$D_{final}$. If /X is not equal to /1, then it will take larger PLL CLOCK cycle count before the final frequency is arrived at. To convert this into time, let the period of the PLL CLK be =$T_{PLLCLK}$. Therefore, period of COUNTER CLOCK=(X, the PLL divider 220 ratio), multiplied by ($T_{PLLCLK}$). Therefore, it takes a total time of Total time=$(X) \cdot (T_{PLLCLK}) \cdot (N)$ to arrive at the final selected core processor 270 clocking speed.

Since $N=(D_{final}-D_{initial})/\Delta$,

Then, Total time=$(X)(T_{PLLCLK})(D_{final}-D_{initial})/\Delta$.

Hence "X" within the PLL divider 220 and "Δ", as defined as the increments between the clock frequencies output by the core divider circuit 260, can be freely selected to result in the desired total switching time. This allows the control of dI/dt on the power supply grid.

Generally, the circuit 200 can be programmed, through use of the core clock divider settings, a PLL divider 220 value, and core divider 260 to result in a desired dI/dt slope, thereby reducing transient voltage swings at power supply. When it is desired that the core processor clock operates at a faster/slower rate than it is currently at, the circuit 200 will perform the necessary scaling, such that the resulting maximum dI/dt is kept to a value of choice.

Figure 3:
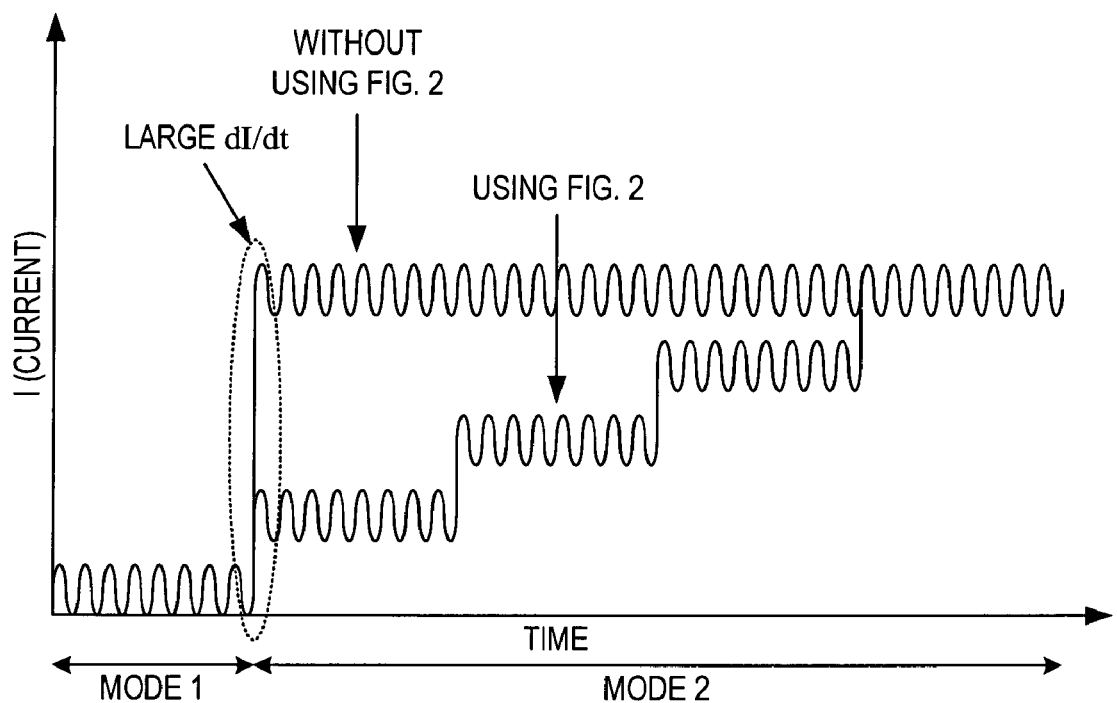
FIG. 3 illustrates a first waveform of current spikes without employment of the circuit of FIG. 2, and a second waveform of current spikes with employment of the circuit of FIG. 2.

Turning now to FIG. 3, illustrated are two different graphs illustrating current spikes in the circuit 100 both with and without employment of the circuit 200. In FIG. 3, there is a first mode (mode 1) and a second mode (mode 2). The first mode represents a slower processing speed for the chip 180, and the second mode represents a faster processing speed for the chip 180. Without employment of the circuit 200, as is illustrated, there is a comparatively large change in current spike in the transition from mode 1 to mode 2. However, with the use of the circuit 200, there are increments in current from mode 1 to mode 2, as the current is not at its maximum until later in time, therefore leading to smaller current spikes between transitions.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A circuit for transitioning clocking frequencies, comprising:
   a clocking circuit providing a first clock signal at a first clock frequency;
   a counter coupled to the clocking circuit;
   a comparator coupled to an output of the counter;
   a first divider coupled to the output of the counter, wherein the first divider outputs a second clock signal at a second clock frequency;
   a second divider interposed between the clocking circuit and the counter; and
   a processor coupled to an output of the first divider, wherein the counter is configured to accept an input from the comparator, and wherein the input from the comparator has a setting, dependent upon results of a comparison performed by the comparator, selected from the set consisting of: increment, decrement, and disable.

2. The circuit of claim 1, wherein the first divider is coupled to the clocking circuit.

3. The circuit of claim 1, wherein the comparator is configured to accept indicia corresponding to a selected frequency.

4. The circuit of claim 1, wherein the counter is incremented, decremented, or disabled based on the setting of the input from the comparator.

5. The circuit of claim 4, wherein the comparator compares a current desired setting of the first divider to an output of the counter, and wherein the comparator selects a control signal indicating one of increment, decrement, or disable, and outputs the control signal to the counter as the input from the comparator based on results of the comparison to thereby cause the counter to either increment, decrement, or become disabled.

6. The circuit of claim 5, wherein:
   if results of the comparison indicate that the desired setting of the first divider is higher than the output of the counter, then the comparator selects a control signal indicating incrementing of the counter;
   if results of the comparison indicate that the desired setting of the first divider is less than the output of the counter, then the comparator selects a control signal indicating decrementing of the counter; and
   if results of the comparison indicate that the desired setting of the first divider is equal to the output of the counter, then the comparator selects a control signal indicating disabling of the counter.

7. A circuit for transitioning clocking frequencies, comprising:
   a clocking circuit providing a first clock signal at a first clock frequency;
   a counter coupled to the clocking circuit;
   a comparator coupled to an output of the counter;
   a first divider coupled to the output of the counter, wherein the first divider outputs a second clock signal at a second clock frequency;
   a second divider interposed between the clocking circuit and the counter; and a processor coupled to an output of the first divider, wherein the first clock signal is provided as an input to the first divider, and wherein the first divider outputs the second clock signal to the processor based on a combination of the first clock signal and an output signal from the counter.

8. The circuit of claim 7, wherein the output signal from the counter indicates a percentage of the first clock frequency by which the first clock frequency is to be adjusted to generate the second clock signal at the second clock frequency.

9. The circuit of claim 7, wherein the second divider generates an output signal pulse to the counter for every predetermined number of pulses of the first clock signal from the clocking circuit.

10. The circuit of claim 9, wherein the second divider causes the counter to increment or decrement its output every predetermined number of pulses of the first clock signal.

11. The circuit of claim 10, wherein the first divider changes the second clock frequency of the second clock signal, based on a combination of the first clock signal and an output signal from the counter, every predetermined number of pulses of the first clock signal.

12. The circuit of claim 11, wherein spikes in the second clock signal are reduced by at least one of adjusting a counter value of the counter to change an amount by which the first clock frequency is adjusted to generate the second clock frequency, or adjusting a rate at which the first divider changes the second clock frequency by changing the predetermined number of pulses of the first clock signal at which the second divider generates an output signal pulse to the counter.

13. The circuit of claim 1, wherein the second divider generates an output signal pulse to the counter for every predetermined number of pulses of the first clock signal from the clocking circuit.

* * * * *